April 16, 1940.  T. WEBER  2,197,401
TRAILER
Filed April 13, 1938  5 Sheets-Sheet 1
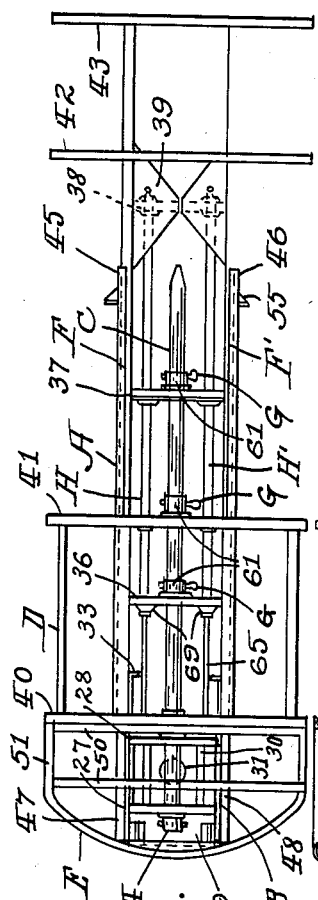
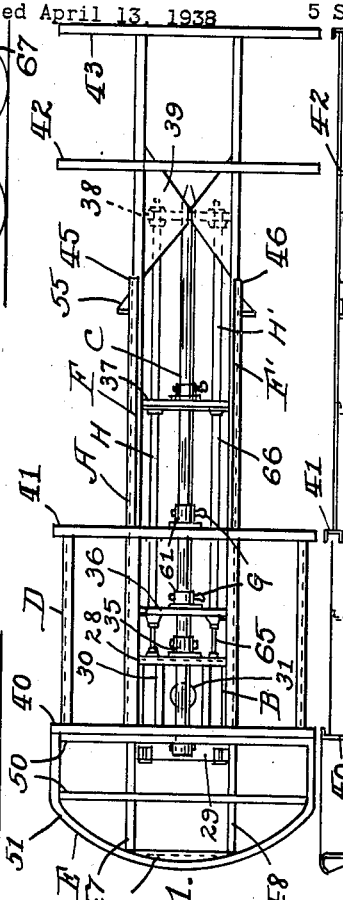
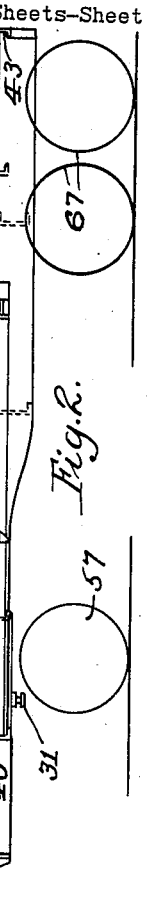
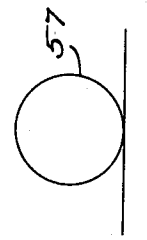
INVENTOR.
Tobias Weber
BY
ATTORNEY.

April 16, 1940.    T. WEBER    2,197,401
TRAILER
Filed April 13, 1938    5 Sheets-Sheet 2
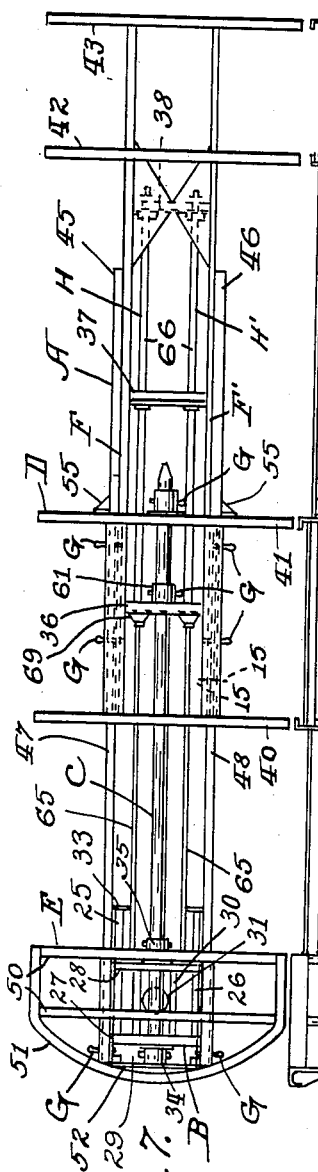
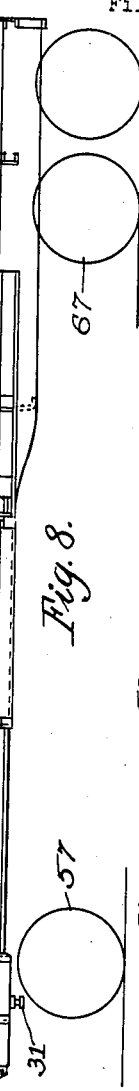
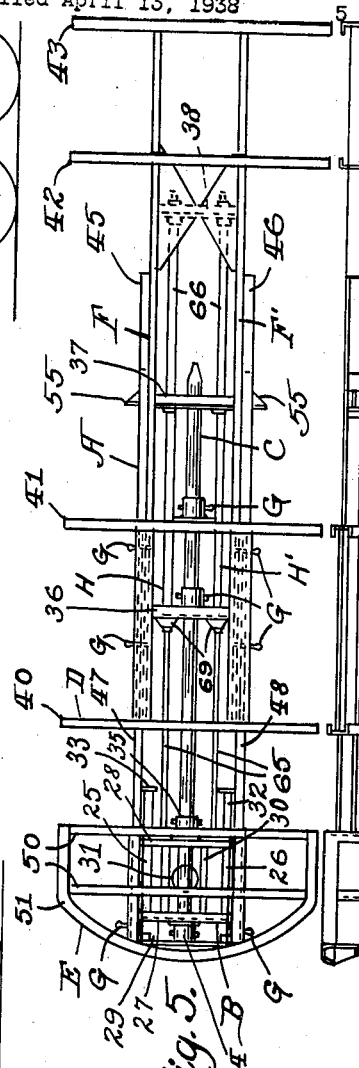
INVENTOR.
Tobias Weber,
BY
ATTORNEY.

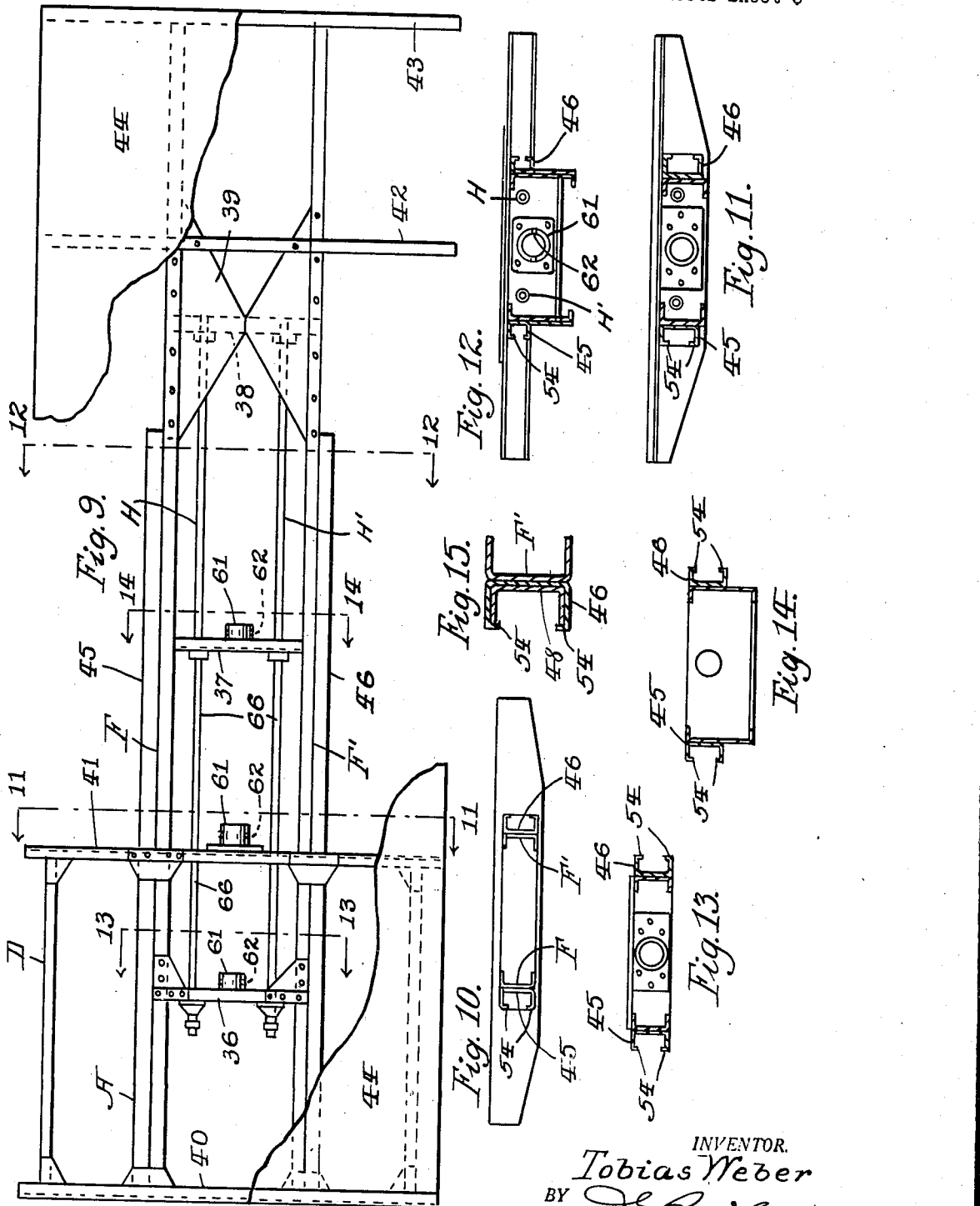

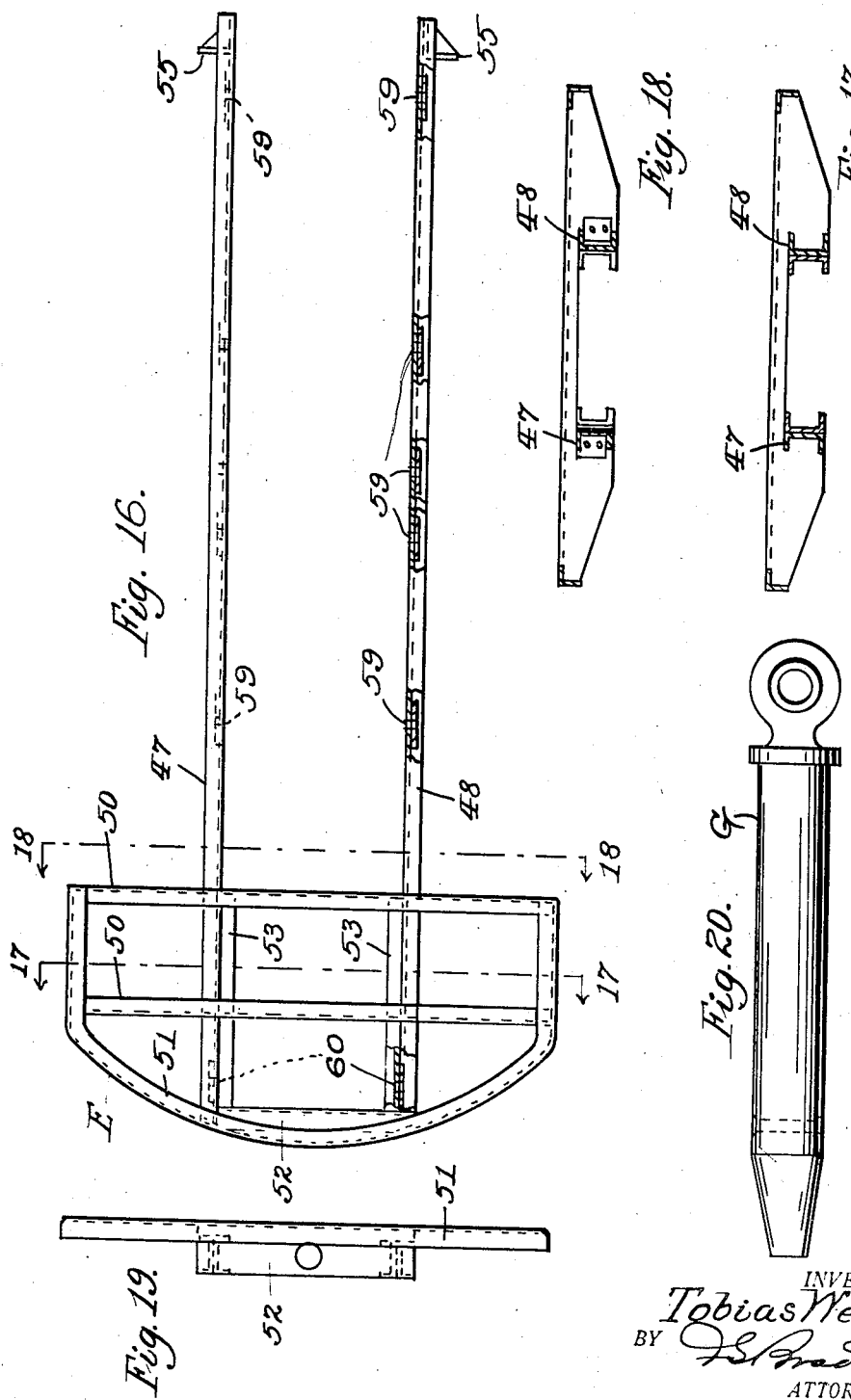

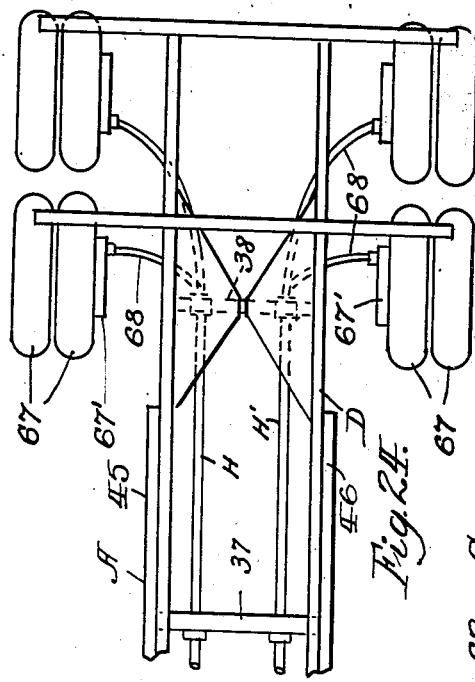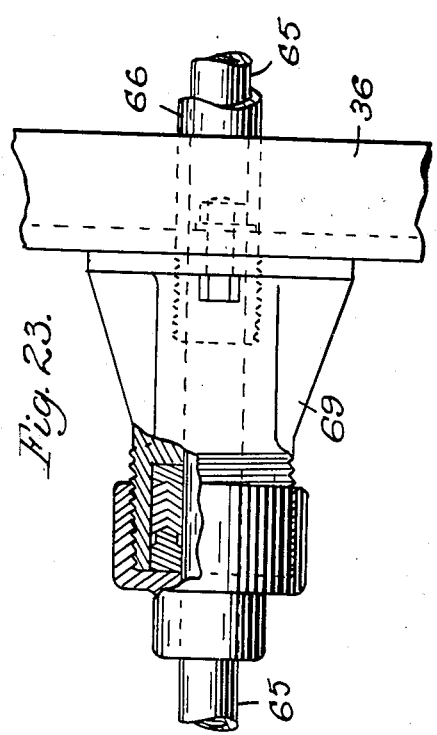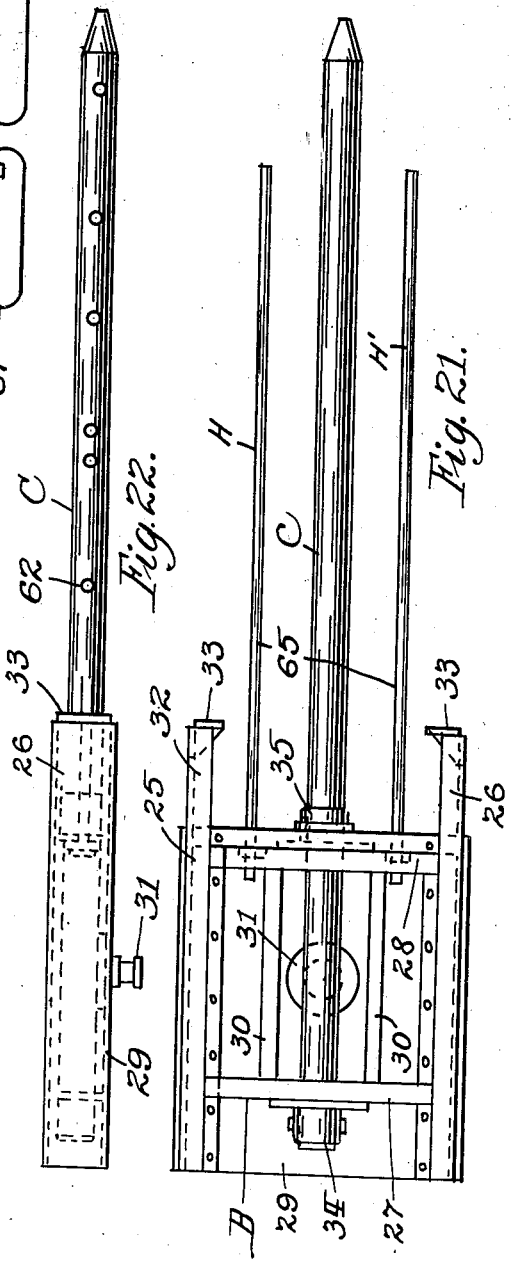

Patented Apr. 16, 1940

2,197,401

UNITED STATES PATENT OFFICE 2,197,401

TRAILER

Tobias Weber, Los Angeles, Calif.

Application April 13, 1938, Serial No. 201,739

13 Claims. (Cl. 280—106)

Generally stated, the invention embodies a trailer which is adapted to have its forward end supported by a fifth wheel upon the rear end of a tractor or if desired to have its forward end supported by its fifth wheel directly mounted upon carrying wheels which in turn may be coupled by a reach in the usual manner to a power driven vehicle.

The primary object of my invention is to provide a trailer which is adjustable lengthwise, whereby it can be easily extended or modified in length to accommodate various kinds of loads, such as for instance a tank of rotary mud or sections of pipe which are commonly used in oil fields. A further object is to provide an extensible trailer of the character stated in which the fifth wheel, by which the forward section of the trailer frame is supported, can be selectively adjusted longitudinally of the trailer frame to most effectively position the forward carrier to accommodate certain kinds of loads upon the trailer. Another object is to provide a trailer having longitudinal adjustment of the trailer frame and in which an essential corresponding longitudinal adjustment of the brake operating means is automatically accorded without in any way depreciating the efficiency of the brakes. Another object is to provide an extensible frame structure in the trailer which has great strength accompanied by maximum simplicity and a minimum of material and which will permit ease of longitudinal adjustment and will effectively withstand the various strains to which a vehicle of the kind stated is subjected.

Other objects and advantages will become apparent from the following detailed description of the invention taken in connection with the accompaning drawings in which Fig. 1 is a plan of my improved semi-trailer frame with the platform removed and showing the parts in closed or contracted position, the drawings necessarily being extremely reduced in scale and partly diagrammatic; Fig. 2 is a side elevation of the structure shown in Fig. 1, the wheels of the trailer and the rear wheel of the tractor to which the semi-trailer is adapted to be coupled by the fifth wheel structure being shown in the position assumed when the semi-trailer is in contracted position; Figs. 3 and 4; 5 and 6; and 7 and 8 are respectively views similar to Figs. 1 and 2 except that the parts of the trailer frame and the rear wheel of the tractor are illustrated in various positions assumed by the parts of the semi-trailer when extended; Fig. 9 is a plan of the body section of the semi-trailer frame, parts only of the platform being shown for greater clearness; Fig. 10 is an elevation of the front end of the body section shown in Fig. 9; Fig. 11 is a section taken on line 11—11 of Fig. 9; Fig. 12 is a section taken on the line 12—12 of Fig. 9; Fig. 13 is a section taken on line 13—13 of Fig. 9; Fig. 14 is a section taken on line 14—14 of Fig. 9; Fig. 15 is a typical section of a detail taken on line 15—15 of Fig. 7; Fig. 16 is a plan of the head section of the semi-trailer frame, parts thereof being broken away and in section to show more clearly the openings for the detachable pins by which the parts of the frame are held in any selected adjustment; Fig. 17 is a section taken on line 17—17 of Fig. 16; Fig. 18 is a section taken on line 18—18 of Fig. 16; Fig. 19 is an end elevation of the structure shown in Fig. 16; Fig. 20 is a plan of one of the pins employed for assisting in coupling the parts of the frame in selected adjustment; Fig. 21 is a plan of the upper fifth wheel structure which forms part of my improved semi-trailer frame; Fig. 22 is a side elevation of the structure shown in Fig. 21; Fig. 23 is a plan partly in section of one of the packing glands by which the sections of the telescopic brake service lines are tightly joined, and Fig. 24 is a plan of a detail of my improved semi-trailer frame showing diagrammatically the flexible connections between the telescopic brake control lines and the brakes.

In the drawings, I have shown my invention applied to a semi-trailer but it will be understood that it is equally applicable to a trailer of usual type in which both the front and rear ends of the frame are supported upon suitable permanently attached carriers. A indicates a suitable semi-trailer chassis having a horizontal frame structure which is adapted to overlie when coupled thereto, the rear end of a tractor in the usual manner. The means for coupling the chassis to the tractor includes an upper fifth wheel structure B, which has a horizontal rectangular skeleton frame formed by a pair of longitudinal channel shaped slides 25 and 26 (see Fig. 21), tied together by a pair of transverse channel members 27 and 28 and apron 29, and reinforced by the inner longitudinal members 30. From this frame a centrally disposed king pin 31 depends, which functions as a pivot member of the companion lower fifth wheel coupling (not shown) of usual construction, carried by the tractor. Only the upper portion of the fifth wheel structure which directly cooperates with the extensible frame of my invention is shown and specifically described. This upper fifth wheel frame structure B has the rearward ends 32 of its slides 25 and 26 extended a suitable distance and provided with a pair of stops 33 for defining the innermost position assumed by the fifth wheel structure when the chassis frame of the trailer is closed and contracted. Rigidly secured to the fifth wheel frame by a pair of couplings 34 and 35 and with its axis on the longitudinal center line of the trailer frame is a heavy tubular shaft C, which forms a substantial supporting axle by which the sections of my improved trailer frame are slidably connected and by which they are prevented from binding while being extended or collapsed.

The trailer frame is composed as shown of two sections, one the body section D and the other the front or head section E. The body section D consists of a pair of longitudinal laterally spaced side members F and F', between which the shaft C is centrally disposed. These side bar members are tied together by the transverse members which in addition form shaft guides 36, 37 and 38, in which said shaft C is adapted to bear and slide freely and by which said frame is assisted in being supported upon the shaft. In addition the transverse support 38 and side bar members F and F' are braced by the gusset plates 39. Also additional supports for the side bar members are provided by the platform transverse channel supports 40, 41, 42 and 43, which may be of any suitable angle iron or other construction and braced and cross braced as desired.

As shown a portion of a platform 44 is mounted upon the platform supports but it will be understood that the frame can be used with or without a platform or that the platform may be constructed as an enclosed or open body in any manner desired. As shown the side bars are riveted and welded together to strengthen the structure. However a pair of outwardly facing channels 45 and 46 are provided on the outer side faces of the side bars which slidingly receive and hold a companion pair of channel slides 47 and 48 of the front section E of the trailer frame to be hereinafter described whereby the front and body sections are adapted to extend or telescope together as desired. The rear end of the body section is supported on suitable carrier wheels 67 (see Fig. 24), in the usual manner.

The front section E of the trailer frame is composed of a suitably shaped structure for supporting the front section of a platform and consists of a pair of parallel slides 47 and 48, each of outwardly facing channel shape cross section, to the forward ends of which are secured platform supporting cross bars 50 and an outer angle band 51. A transverse stop member 52 is secured across the forward ends of the slides and inwardly facing longitudinal channel members forming guides 53 are secured to the slides, in which the upper fifth wheel structure B is adapted to slide longitudinally. The outer edges of the channel bars 45 and 46 are formed with inturned longitudinal shoulders 54 (see Fig. 15), whereby the slides 47 and 48 are gibbed in the longitudinal channel bars 45 and 46 so as to slide freely longitudinally. Stops 55 (see Figs. 7 and 16), serve to limit the forward sliding movement of the front section and prevent separation of the frames by impinging against the transverse bar 41. The channel guides 53 on the inner faces of the slides 47 and 48 coincide longitudinally with the ends of the inner members of the side bars F and F' of the body frame, when the front section is closed against the body frame as shown in Figs. 1 and 2 and form continuous channel guides in which the upper fifth wheel structure B may reciprocate longitudinally. Also when the front and body sections of the frame are closed, the platform sections of the two, coincide horizontally to produce a longitudinally continuous platform over the entire structure. When the frame is closed and the upper fifth wheel structure moved into receded position, as shown in Fig. 1, the stops 33 on the side extensions 25 and 26 impinge against the transverse member 36 and limit the innermost position which the upper fifth wheel is permitted to assume.

Thus the upper fifth wheel structure is shiftable longitudinally between the position shown in Fig. 1 and the position shown in Fig. 3 to vary the location of the support afforded by the fifth wheel below the forward end of the frame of the vehicle. This movable upper fifth wheel structure may be used to most effectively position the support below the front end of the trailer frame and load carried thereby. For instance a short heavy load is more effectively supported by placing the fifth wheel structure in fully receded position as shown in Fig. 1, while a long load like drill pipe sections is more effectively supported by extending the fifth wheel into fully extended position as shown in Fig. 3. This also holds true if the sections of the frame are extended into either of the modified positions shown in Figs. 5 and 7. It will be noted that the front and body sections of the frame may assume either fully extended position as shown in Fig. 7, or modified extended position as shown in Fig. 5 for effectively carrying certain loads, in either of which positions the fifth wheel structure is moved into its forward position and fastened as will be hereinafter described. When the front section of the frame is extended or modified in position the shaft of the fifth wheel structure slides in the transverse supports of the body frame. This shaft serves to stiffen the frame and reinforce its strength. When fastened to the frame as will be hereinafter described it materially strengthens the frame and prevents any tendency of the parts binding while the sections of the frame and the fifth wheel structure are being adjusted.

For the purpose of illustrating the adjustments of the frame the relative positions assumed by the tractor wheels 57 are illustrated diagrammatically in Figs. 2, 4, 6 and 8. Also the usual rear semi-trailer wheels 67 are indicated.

The body frame section is coupled to the front frame section and to the central longitudinal shaft C which is carried by the upper fifth wheel structure by any suitable means, such for instance as the readily removable pins which are inserted in suitable positioned pin receiving holes, either singly or in pairs in the body and front frame sections and upper fifth wheel structure. Also the shaft C is coupled to the body frame section in any of its adjusted positions in the same manner. In Fig. 20 I have shown one form of pin G, which may be used for this purpose. Coinciding holes 59, either singly or in pairs through the longitudinal sliding members of the body and head frame sections are adapted to receive the pins G and separably hold the parts locked together in any of the positions shown in Figs. 1, 3, 5 and 7. Coinciding holes 60 in the longitudinal members of the front frame section and fifth wheel structure, in a similar manner, receive pins G to lock the upper fifth wheel either in forward or modified position. In like manner the shaft and bearings 61, in which the shaft is held upon the transverse members 41 and 36 of the body frame section have coinciding holes 62 which receive pins G and rigidly fasten the shaft and body frame section and thus reinforce the strength of the latter while holding the upper fifth wheel structure in selected adjusted position longitudinally.

To provide for the operation of vacuum (pneumatic or hydraulic) brakes on the semi-trailer from the tractor or power driven vehicle to which the trailer is attached, I provide telescopic lines of brake control tubing on the body frame section and upper fifth wheel structure. As shown lines of telescopic brake controlling tubing H and H' are arranged longitudinally on each side of the shaft and between the longitudinal sliding members of the body and front frame sections. Each line has an inner tube 65 anchored to the upper fifth wheel structure and adapted to be coupled to the source of actuating vacuum or other brake actuating medium supplied by the tractor to operate the brakes simultaneously on the tractor and semi-trailer. This inner tube telescopes into an outer tube 66, the latter being carried by the body frame section and being coupled at its rearward end with a suitable brake 67' on the wheels 67 by a suitable connection such as the flexible tubing 68 as shown in Fig. 24. A suitable gland such as 69, see Fig. 23, between the inner and outer sections of the telescopic tubing is provided for sealing the movable joint between the telescopic members. In this manner the various adjustments of the semi-trailer frame and brake control lines are coincident and automatic.

The various adjustments of the parts of the trailer are easily made by propelling the tractor forwardly or backwardly after the proper pins have been removed. After adjustment the trailer is ready for operation by reapplying the pins which were previously removed or suitably applied for making the adjustments.

In accordance with the patent statutes, I have described the principles of operation of my invention together with the construction thereof which I now consider to represent the best embodiment thereof but I desire to have it understood that the structure shown is only illustrative and that the invention can be carried out by other means and applied to uses other than those above set forth within the scope of the following claims.

I claim:

1. A trailer having a supporting frame, a fifth wheel structure shiftable longitudinally upon said frame, a supporting shaft slidably connected with said frame and rigidly attached by its forward end to said fifth wheel structure, and means for rigidly attaching said fifth wheel structure in selected longitudinal position to said frame.

2. A trailer having a body frame and a head frame extensibly secured together longitudinally, a fifth wheel structure movable longitudinally between the body and head frames having a rearwardly extending shaft axially disposed and slidably connected with said body frame and removable means for rigidly fastening said shaft to the body frame whereby the strength of the body frame is reinforced.

3. In a trailer, a fifth wheel structure having upper and lower members swiveled together, a longitudinally extensible body frame structure movably connected with said upper member to slide longitudinally, means for fastening said frame structure to said upper member in selected longitudinal position, and a coincidentally extensible brake actuating duct connected to the upper member of said fifth wheel structure and to said body frame structure.

4. In a trailer, a fifth wheel structure having upper and lower members swiveled together, said upper member having a shaft extending therefrom, and a longitudinally extensible body frame mounted upon said shaft and movably connected to said upper member to slide longitudinally thereon, and means for fastening said frame in selected longitudinal position on said upper member.

5. In a trailer, a fifth wheel structure having upper and lower members swiveled together, said upper member having a rigid shaft extending rearwardly therefrom, a longitudinally extensible body frame having forward and rearward members slidably connected together, said forward member being slidably mounted upon said upper member and said rearward member of said body frame being movably mounted upon said shaft to slide longitudinally thereon, means for fastening said forward member in selected longitudinal position on the upper member of said fifth wheel structure and means for fastening said rearward member on said shaft in selected longitudinal position.

6. A fifth wheel structure having upper and lower members swiveled together to turn in a substantially horizontal plane, said upper member having longitudinal parallel gib members and a rearwardly extending trailer frame reinforcing shaft.

7. A fifth wheel structure having upper and lower members swiveled together to turn in a substantially horizontal plane, said upper member having longitudinal gib members by which the head frame of a trailer structure may be adjustably supported to selectively position the load of the forward end of a trailer frame longitudinally thereon.

8. A fifth wheel structure having upper and lower members swiveled together to turn in substantially a horizontal plane, said upper member having a rigid rearwardly extending non-extensible central shaft for reinforcing the strength of a trailer body frame thereon.

9. A trailer having head and body frames extensibly secured together, a fifth wheel member upon which the head frame is slidably supported in selective longitudinal position, a longitudinally extending shaft supported by said fifth wheel member upon which the body frame is mounted, and means for coupling the head frame to said fifth wheel element in selective longitudinal position.

10. A trailer having a supporting frame composed of head and body members extensible longitudinally, a fifth wheel member slidably supported in selective longitudinal position upon said head member, a longitudinal shaft rigidly supported by said fifth wheel member and upon which the body member of said frame is slidably supported, and means for coupling said body member rigidly to said shaft.

11. A trailer having head and body frames extensibly secured together, a fifth wheel member slidably supported in selective longitudinal position upon said head frame, and a longitudinally extending shaft supported by said fifth wheel member and upon which the body frame is mounted.

12. A trailer having head and body frames telescoped together, a fifth wheel element in relation to which said head frame is adjustable in selective longitudinal position, and a telescoped brake actuating assemblage having its members connected to said fifth wheel element and said body frame.

13. A trailer having extensible head and body frames, a fifth wheel structure upon which said head frame is adjustable longitudinally independently of said body frame, and a brake actuating telescopic duct having its opposite end sections mounted upon said fifth wheel structure and said body frame whereby its longitudinal adjustment is coincident with the adjustment of said fifth wheel structure as related to said head frame independently of said body frame.

TOBIAS WEBER.